(12) United States Patent
Hirai (10) Patent No.: US 9,007,494 B2
(45) Date of Patent: Apr. 14, 2015

(54) IMAGE PROCESSING APPARATUS, METHOD FOR CONTROLLING THE SAME AND STORAGE MEDIUM

(71) Applicant: Canon Kabushiki Kaisha, Tokyo (JP)

(72) Inventor: Shinya Hirai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 192 days.

(21) Appl. No.: 13/862,731

(22) Filed: Apr. 15, 2013

(65) Prior Publication Data

US 2013/0300901 A1   Nov. 14, 2013

(30) Foreign Application Priority Data

May 9, 2012   (JP) .................. 2012-107980

(51) Int. Cl.
| | |
|---|---|
| *H04N 5/228* | (2006.01) |
| *H04N 5/217* | (2011.01) |
| *H04N 9/64* | (2006.01) |
| *H04N 9/083* | (2006.01) |
| *H04N 3/14* | (2006.01) |
| *H04N 5/335* | (2011.01) |
| *H04N 9/04* | (2006.01) |
| *H04N 5/208* | (2006.01) |

(52) U.S. Cl.
CPC .............. *H04N 9/646* (2013.01); *H04N 5/208* (2013.01); *H04N 9/045* (2013.01)

(58) Field of Classification Search
USPC .................. 348/222.1, 241, 242, 273
See application file for complete search history.

(56) References Cited

U.S. PATENT DOCUMENTS

| | | | | |
|---|---|---|---|---|
| 2010/0085447 | A1* | 4/2010 | Kanemitsu et al. | 348/241 |
| 2011/0134292 | A1* | 6/2011 | Hirai | 348/280 |
| 2011/0199542 | A1* | 8/2011 | Hirai | 348/624 |
| 2013/0222531 | A1* | 8/2013 | Hirai, Yuichi | 348/32 |
| 2014/0022419 | A1* | 1/2014 | Hirai, Shinya | 348/241 |

FOREIGN PATENT DOCUMENTS

| | | |
|---|---|---|
| JP | 2001-008038 A | 1/2001 |
| JP | 2007-028348 A | 2/2007 |
| JP | 2008-015741 A | 1/2008 |
| JP | 2009-199104 A | 9/2009 |

* cited by examiner

*Primary Examiner* — Daniel M Pasiewicz
(74) *Attorney, Agent, or Firm* — Cowan, Liebowitz & Latman, P.C.

(57) ABSTRACT

An image processing apparatus comprises a noise suppression unit configured to perform noise suppression processing to a plurality of color signals obtained by band dividing an image signal by color, a one-plane conversion unit configured to generate a one-plane image having one signal per pixel, from the plurality of color signals to which the noise suppression processing has been done by the noise suppression unit, a processing unit configured to perform image processing in which a frequency characteristic changes, with respect to the one-plane image, a noise extraction unit configured to extract a noise component from the image signal, and an adding unit configured to add the noise component extracted by the noise extraction unit to a signal obtained by the processing unit.

10 Claims, 9 Drawing Sheets

IMAGE PROCESSING APPARATUS, METHOD FOR CONTROLLING THE SAME AND STORAGE MEDIUM

BACKGROUND OF THE INVENTION

1. Field of the Invention

The present invention relates to an image processing apparatus, a method for controlling the same and a storage medium.

2. Description of the Related Art

In recent years, advances have been made in the miniaturization of pixels of image sensors. The miniaturization of pixels in some cases causes noise to increase. Various methods to suppress the noise through signal processing are known, but it is known that suppressing noise causes a blurring effect on images.

As a method to avoid this, a method is known (Japanese Patent Laid-Open No. 2008-015741) that suppresses noise by dividing an image signal into a plurality of frequency band components (color components).

Further, a method is known (Japanese Patent Laid-Open No. 2009-199104) that suppresses noise by generating a reduced image signal obtained by reducing an image signal, and mixing the reduced image signal with the original image signal. According to this method, first by performing reduction processing on an inputted image signal a reduced image is generated, which contains low-frequency components to a greater extent than the inputted image. Next, an edge strength is detected from the low-frequency component reduced image signal, in order to determine, based on the edge strength, regions in which an edge component should be preserved. Then, a new image signal is generated by mixing the original image signal with the low-frequency component reduced image signal, while changing the weighting from region to region in such a way that images in the regions in which the edge component should be preserved do not blur.

However, when in the noise suppression processing described above the measures regarding image blurring are insufficient, increasing the amount of noise suppression leads to problems such as artifacts occurring, blurred noise patterns giving a visually uncomfortable feeling, or object microstructures that must not be removed being removed together with the noise component, which causes the image to become unnatural.

As a method to avoid this, a method is known (Japanese Patent Laid-Open No. 2001-008038) that, by capturing with a multi-band camera, uses the fact that there is a correlation between the images of different colors to adaptively add an edge component and a noise suppression component to a smoothed image. Moreover, a method is also known (Japanese Patent Laid-Open No. 2007-028348) that, after having frequency-separated an image, eliminates noise from the high frequency component, to later add a predefined noise before mixing it with the low-frequency component. To some extent, these methods avoid that visually unnatural images result from noise components being residual in images that have undergone smoothing.

SUMMARY OF THE INVENTION

However, in the methods described above, the aspect of image quality unintentionally deteriorating due to the frequency characteristics of the residual noise being altered by subsequent signal processing is not taken into consideration. The present invention makes it possible, in an image processing apparatus for performing noise processing and the like by dividing an input signal into a plurality of bands, to keep the frequency characteristics of the residual noise.

One aspect of the invention according to embodiments, relates to an image processing apparatus comprising, a noise suppression unit configured to perform noise suppression processing to a plurality of color signals obtained by band dividing an image signal by color, a one-plane conversion unit configured to generate a one-plane image having one signal per pixel, from the plurality of color signals to which the noise suppression processing has been done by the noise suppression unit, a processing unit configured to perform image processing in which a frequency characteristic changes, with respect to the one-plane image, a noise extraction unit configured to extract a noise component from the image signal, and an adding unit configured to add the noise component extracted by the noise extraction unit to a signal obtained by the processing unit, wherein the noise suppression unit comprising, a first noise suppression unit configured to perform the noise suppression processing to the color signal of each color in the plurality of color signals, a first reduction unit configured to reduce a size of the plurality of color signals, a second noise suppression unit configured to perform the noise suppression processing to the plurality of color signals of which the size has been reduced, an enlargement unit configured to enlarge the size of the plurality of color signals to which the noise suppression processing by the second noise suppression unit has been done, to the size before being reduced; and a mixing unit configured to mix, separately for each color, the plurality of color signals output from the first noise suppression unit and the plurality of color signals output from the enlargement unit.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

First Embodiment

Figure 1:
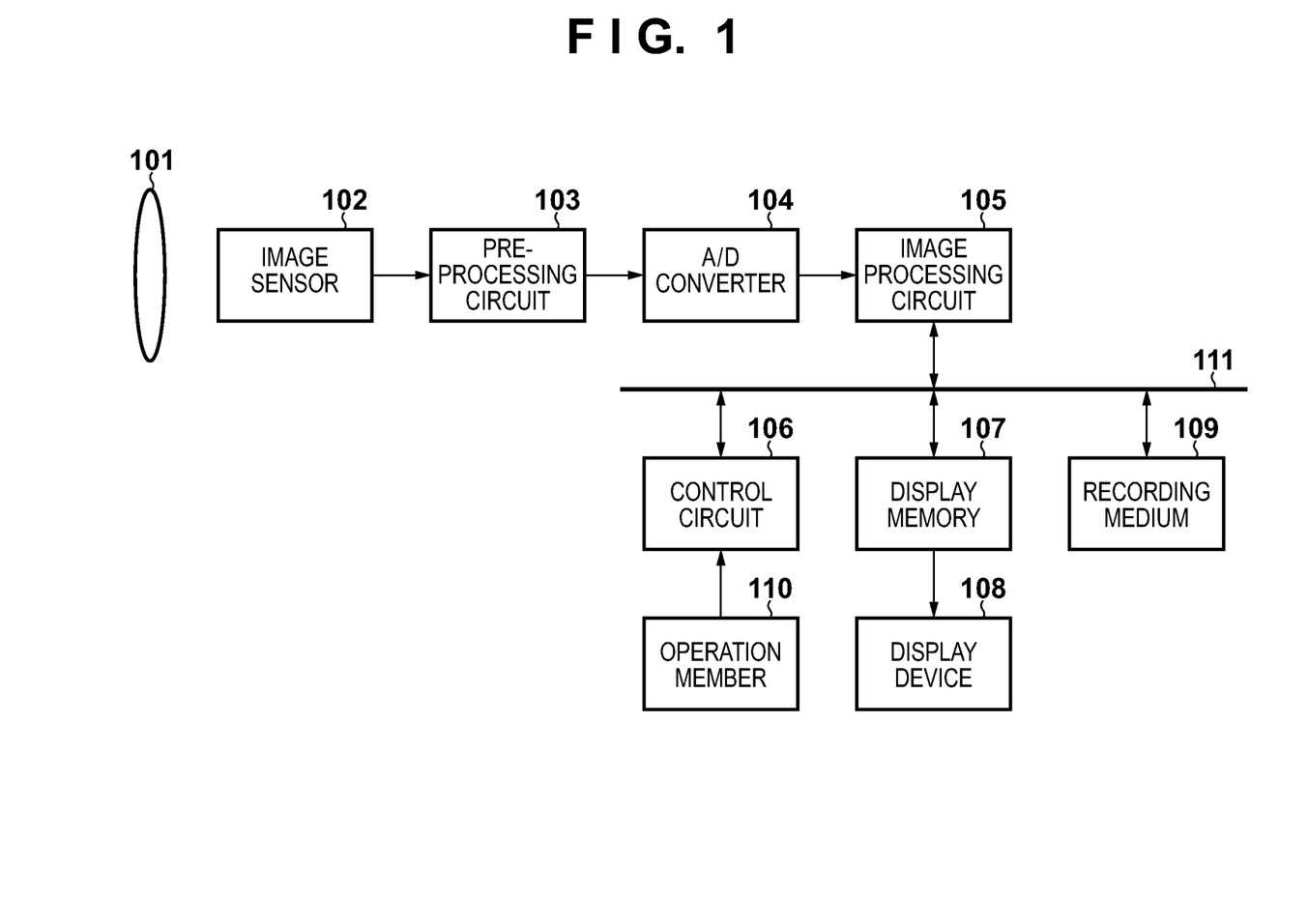
FIG. 1 is a diagram showing a schematic configuration of a digital camera according to an embodiment of the present invention.

FIG. 1 is a diagram showing a schematic configuration of a digital camera 100 as an image processing apparatus according to an embodiment of the present invention. The present invention, if being an apparatus capable of applying image processing to an image signal, is not limited to a digital camera but may as well be implemented by a personal computer, a digital video camera or the like. Each block within the digital camera 100 of FIG. 1, unless its configuration is specifically designated below, may be configured in hardware using a dedicated logic circuit or memory, or may be configured in software by a computer such as a CPU executing a processing program stored in memory.

Figure 11:
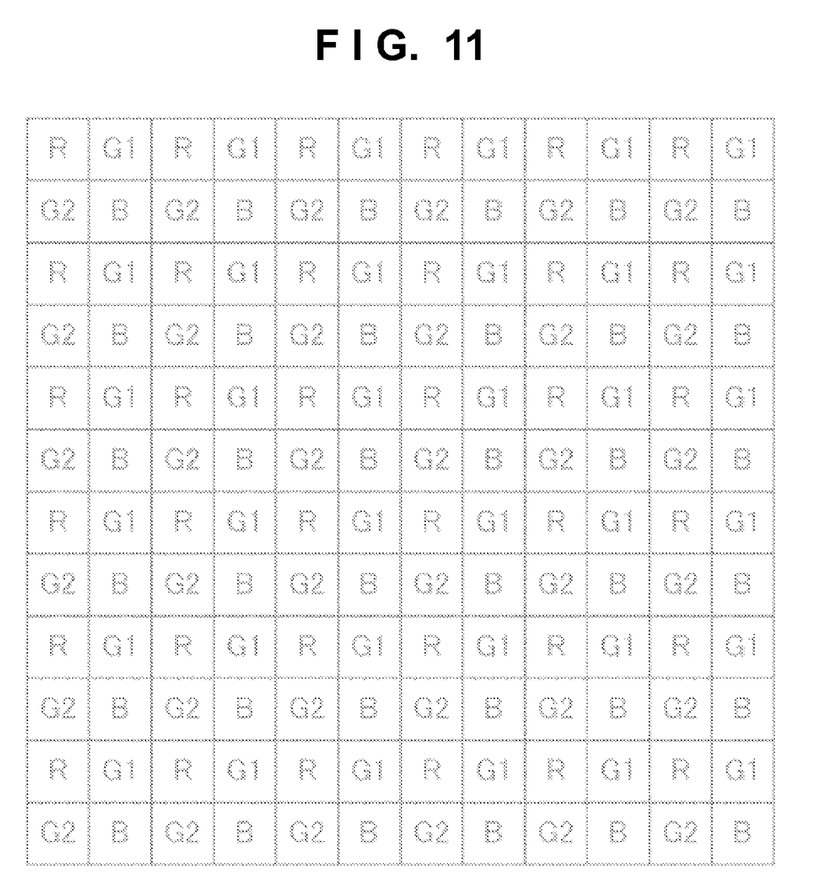
FIG. 11 is a diagram showing an example of a color filter array of an image sensor.

In FIG. 1, an optical system 101 comprises a shutter device, a diaphragm device, and a lens group including a zoom lens and a focus lens. The optical system 101 adjusts the amount of light, or the magnification or focus position of an object image reaching the image sensor 102. The image sensor 102 is a photoelectric converter such as a CCD (charge-coupled device) or a CMOS (complementary metal-oxide-semiconductor) sensor, which by converting the object image into an electric signal generates an image signal. In the present embodiment the image sensor 102 is assumed to be a CCD. Further, it is assumed to have a Bayer type color array as shown in FIG. 11.

A pre-processing circuit 103 comprises a CDS (correlated double sampling) circuit and an amplifier circuit. The CDS circuit suppresses the dark current included in the image signal generated by the image sensor 102, and the amplifier circuit amplifies the image signal output from the CDS circuit. An A/D converter 104 converts the image signal output from the pre-processing circuit 103 into a digital image signal.

An image processing circuit 105 performs white-balance processing, noise suppression processing, gradation conversion processing, edge enhancement and correction processing etc. with respect to the image signal, and outputs the image signal as a luminance signal Y and color difference signals U, V. From the image signal, the image processing circuit 105 furthermore calculates a luminance value for the object and an in-focus value that indicates the focusing state of the object. The image processing circuit 105 is capable of performing image processing with respect not only to the image signal output from the A/D converter 104, but likewise to an image signal read from a recording medium 109. Besides, the image processing circuit 105 performs encoding processing to generate image data for the purpose of recording an image signal on the recording medium 109, and performs decoding processing of image data recorded on the recording medium 109 to restore the image signal.

A control circuit 106 controls the circuits that make up the digital camera of the present embodiment to operate the digital camera as a whole. Based on instructions sent from an operating member 110 and the luminance value obtained from the image signal processed by the image processing circuit 105, it also performs driving control of the optical system 101 and image sensor 102.

A display memory 107 is for temporarily storing an image signal based on which an image is to be displayed on a display device 108. The display device 108 is configured with an organic EL (electroluminescence) display or liquid-crystal display, in order to display images using an image signal generated by the image sensor 102 or an image signal read from the recording medium 109. By constantly updating the display of consecutive image signals read from the image sensor 102, it is able to function as an electronic viewfinder. The display device 108 can display not only images but also character information such as sensitivity information, aperture, or shutter speed selected by the user or determined by the camera, a status display of the digital camera, a graph showing a luminance distribution measured by the image processing circuit 105, and so on. The recording medium 109, being a memory for recording encoded image signals, is e.g. a semiconductor memory such as flash memory (registered trademark) or an SD card, or an optical/magnetic recording medium such as a Blu-ray Disc, DVD, CD, or tape. The recording medium 109 may be configured to be detachably attached to the digital camera 100, or may be built into the digital camera 100.

The operating member 110 is for the user to operate for sending instructions to the digital camera 100. A bus 111 is used for exchanging image signals between the image processing circuit 105, the control circuit 106, the display memory 107, and the image recording medium 109.

The following describes an example of the operation of the digital camera 100 according to the present embodiment at the time of capturing.

When the operating member 110 is operated by the user to send an instruction for starting capturing preparations, the control circuit 106 starts control of the operation of each circuit. The image sensor 102 generates an analog image signal by photoelectrically converting the object image transmitted through the optical system 101, while the analog image signal, having been processed by the pre-processing circuit 103, is digitized by the A/D converter 104. The image processing circuit 105 performs white balance processing, noise suppression processing, gradation conversion processing, contour correction processing and the like with respect to the image signal output from the A/D converter 104.

The image signal, having been processed in the image processing circuit 105, is displayed via the display memory 107 as an image on the display device 108. As described above, the image sensor 102 continually generates image signals while the display device 108, by using read-out consecutive image signals to display and update in real time the image of the object, functions as an electronic viewfinder.

Until the user operates a shutter button included in the operating member 110, these processing tasks are repeated. When the user operates the shutter button, the control circuit 106 readjusts the operation of the optical system 101 based on the luminance value and the in-focus value obtained by the image processing circuit 105, to perform capturing of a still image. The image processing circuit 105, after performing various kinds of image processing including noise suppression processing with respect to the image signal of the still image, ultimately encodes it to generate image data. Then, the recording medium 109 records the image data output from the image processing circuit 105.

Here, the noise suppression processing in the image processing circuit 105, which is a feature of the present invention, will be explained in detail. As the order in which processing is performed, it is preferable to first carry out noise suppression processing with respect to the output signal from the image sensor, before interpolation processing or edge enhancement processing is carried out. The reason is that the amount of noise and the frequency characteristics of noise components superimposed on the output signal from the image sensor can be predicted to some extent such that it is possible to appropriately perform noise removal. And because on the other hand, in case of performing processing such as adaptive interpolation processing whereby the frequency characteristics of the signal that is being processed are changed or enhanced, noise components also change in the same way, making it difficult to estimate the amount of noise such that appropriately performing noise removal becomes troublesome.

However, if performing edge enhancement processing and interpolation processing after having performed noise processing, there is a possibility that noise components that remained or were added during the noise processing change in their frequency characteristics, thereby turning visually disagreeable. Furthermore, because more memory for referring to peripheral pixels is required in order to perform edge enhancement processing and interpolation processing after noise suppressing processing, an increase in the amount of memory used has to be taken into account as well. For example, if noise suppression processing is performed as hardware processing by use of delay lines, signals from lines above and below a line of interest are read into delay lines as needed to perform processing of the line of interest by referring to these signals. Because the processed signal is output as a signal for one line, in order to perform subsequent processing, a process of reading noise-suppressed signals into yet other delay lines is required.

Moreover, if performing noise suppression processing in association with band division, the signal amount is further increased. For example, in case of a single-plate sensor such as a primary-color Bayer array, due to down-sampling processing performed at the time of band division each pixel acquires all color signals.

Figure 12:
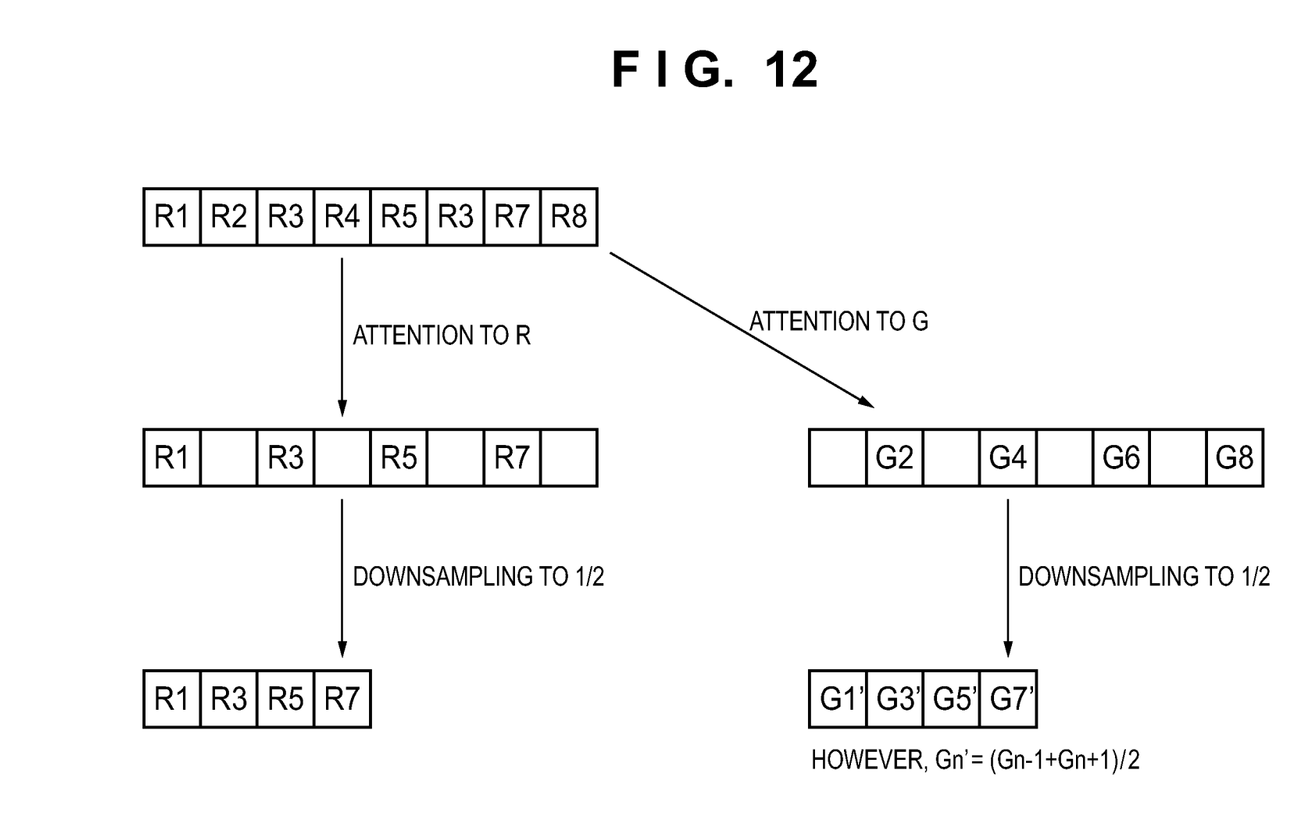
FIG. 12 is a diagram for explaining that each pixel has all color signals due to a down-sampling processing.

The reason for this will be explained. Here, it is explained for a case of downsampling processing to half the number of pixels in the horizontal direction. The color filters of a given row are assumed to be arranged in the order of R, G, R, G, R, G . . . as in FIG. 12. When in this row looking at the R signal alone, the R signal, which originally is lined up at a cycle of one per two pixels, turns into a signal of every pixel due to the downsampling processing. Also when looking at the G signal alone, the G signal, which originally occurs once per two pixels, has turned into a signal of every pixel due to the downsampling processing. However, in the downsampling of the G signal, values are calculated by computing the average value of neighboring pixel values on both sides in order to match the centroid position of the G signal to the R signal. Downsampling processing for rows where the color filters are of R and B can be performed in the same way. Note that the color filters G are processed independently for alternating lines as distinguished by G1 and G2 in the Bayer array shown in FIG. 11.

By performing downsampling processing in this manner, all RGB color signals (R, G1, G2, B) come to be generated in one and the same pixel position even without interpolation. Hereinafter, the generation of a plurality of types of signals in the same pixel position in this manner will be referred to as "synchronization". Since an image signal that has undergone downsampling processing is synchronized, in order to mix the original image signal with this downsampled image signal, the original image signal has to be synchronized as well.

As described above, synchronization due to noise suppression processing in association with band division adds to the amount of data, thus increasing the amount of memory required. It may be contemplated to reduce the data count of the synchronized signal to avoid this. For example, it may be contemplated to sample the signal color by color such that it becomes a one-plane image corresponding to the original Bayer array, store the signal in the memory, and then perform post-processing. While the amount of memory required can be reduced thereby, noise components may change in their frequency characteristics and become visually disagreeable due to the above one-plane conversion processing.

Figure 2:
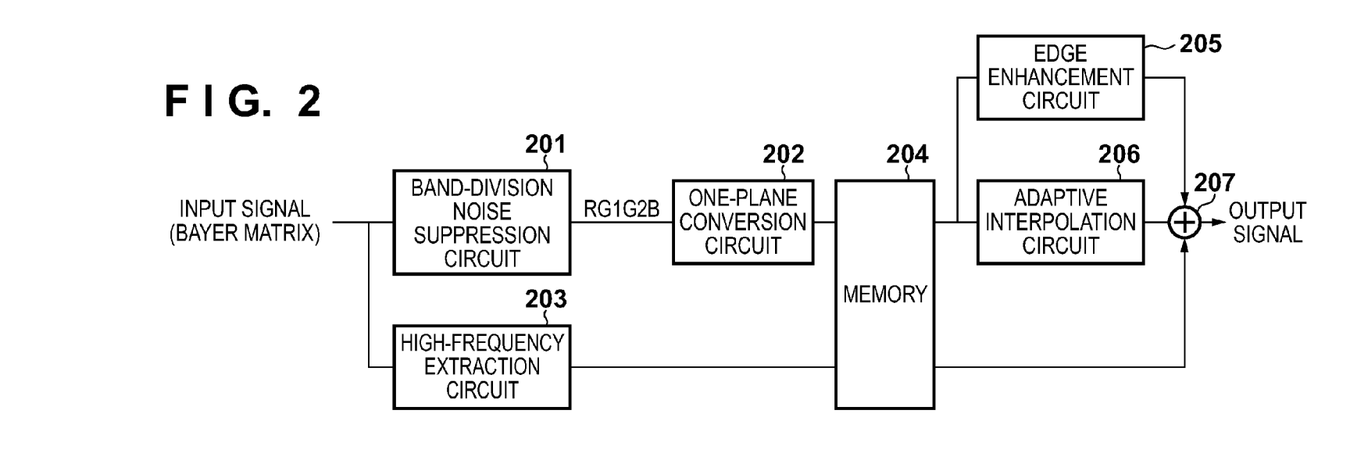
FIG. 2 is a diagram showing a part of the configuration of an image processing circuit 105 according to a first embodiment of the present invention.
Figure 3:
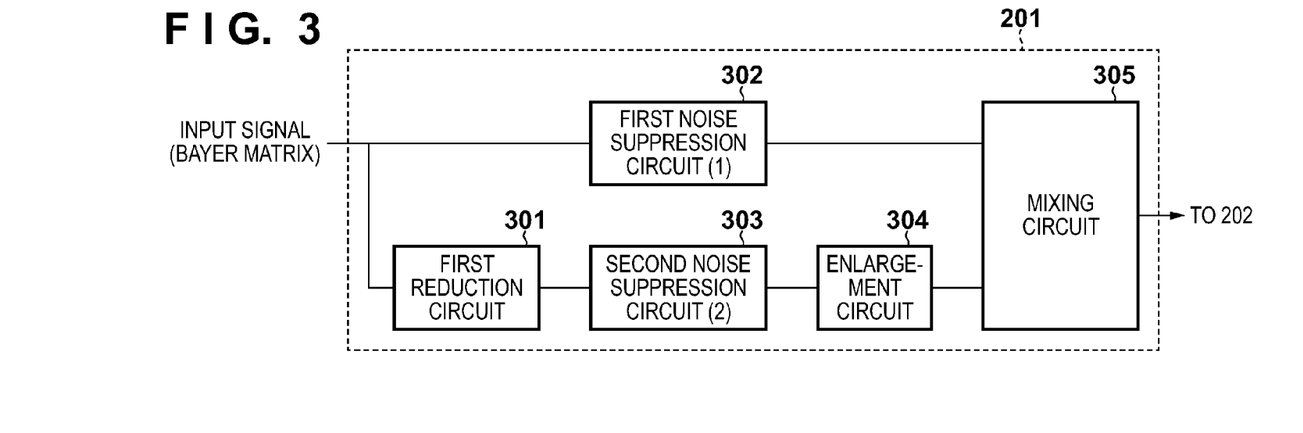
FIG. 3 is a diagram showing a configuration example of a band-division noise suppression circuit 201 in FIG. 2.

The image processing circuit 105 corresponding to the present embodiment, which is configured based on the above contemplation, will be described with reference to FIGS. 2 and 3. FIG. 2 is a diagram showing a part of the configuration of the image processing circuit 105, while FIG. 3 is a diagram showing one example of the configuration of a band-division noise suppression circuit 201.

The image processing circuit 105 of the present embodiment includes the band-division noise suppression circuit 201, a one-plane conversion circuit 202, a high-frequency extraction circuit 203, a memory 204, an edge enhancement circuit 205, an adaptive interpolation circuit 206, and an adder 207. The band-division noise suppression circuit 201 may include a first reduction circuit 301, a first noise suppression circuit 302, a second noise suppression circuit 303, an enlargement circuit 304, and a mixing circuit 305.

Figure 4:
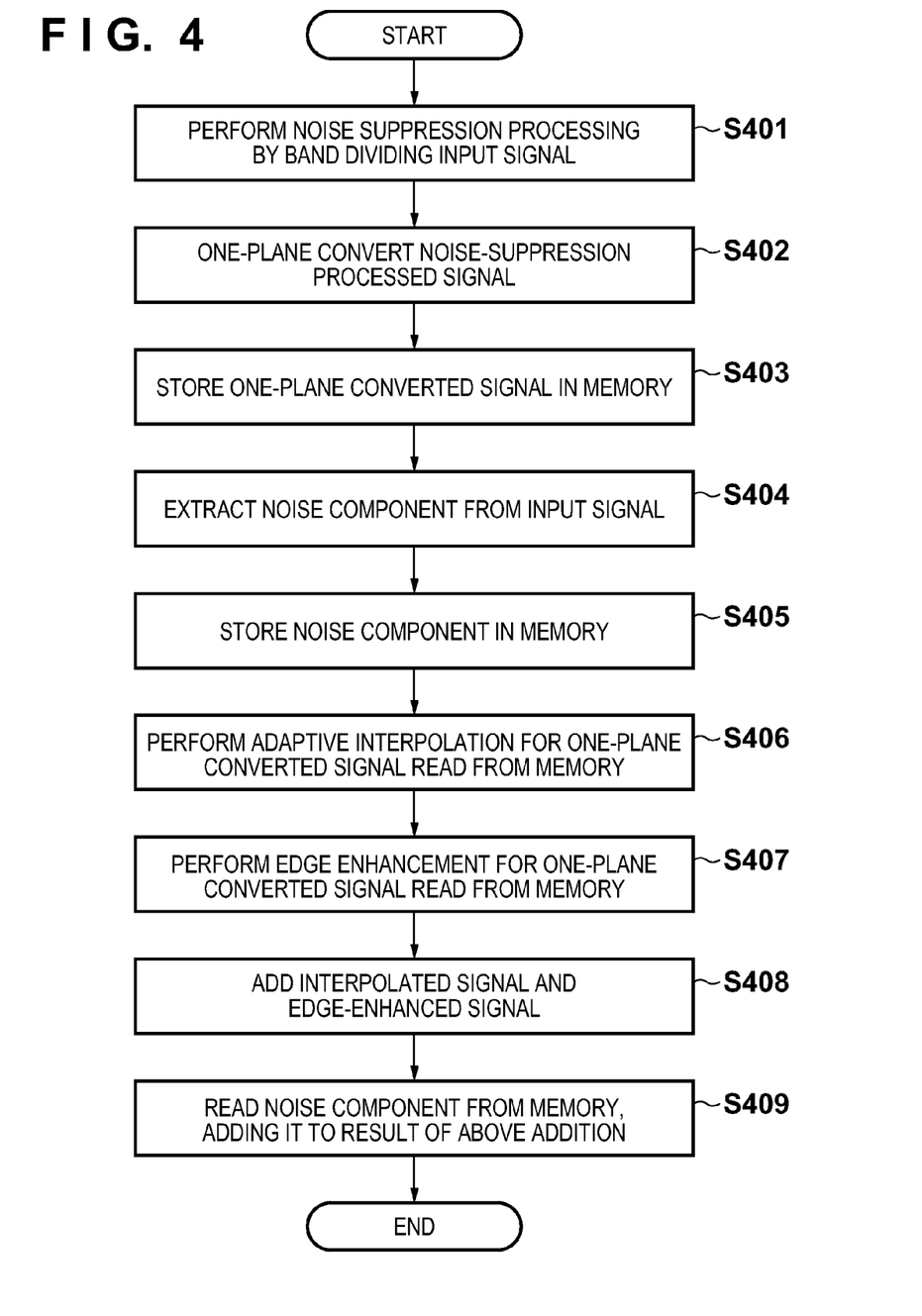
FIG. 4 is a flowchart for explaining the processing content in the image processing circuit 105 of FIG. 2.

FIG. 4 is a flowchart for explaining the processing contents of the circuits. Hereinafter, the operation of the image processing circuit 105 corresponding to the present embodiment will be described with reference to the flowchart of FIG. 4 and the block diagrams of FIGS. 2 and 3. Upon receiving an image signal output from the A/D converter 104, the image processing circuit 105 performs the processing shown in the flowchart of FIG. 4. Note that white balance processing, color processing, gradation conversion processing and so on are omitted.

In step S401, the band-division noise suppression circuit 201 performs band division to perform noise reduction processing with respect to the image signal input. The band-division noise suppression circuit 201 performs processing by the following method. With respect to the image signal, the first noise suppression circuit 302 performs noise reduction processing for each of the color signals R, G1, G2, and B. The noise suppression processing e.g. evaluates signal value differences between a pixel of interest and neighboring pixels, computes an average value using only pixels in which the difference lies within a prescribed value (for example, within a threshold value Th), and replaces the pixel of interest value with the average value for output. However, since the image signal is a Bayer array, processing is performed with respect to color signals obtained by separating according to color (R, G1, G2, B) and synchronizing by a low-pass filter with filter coefficients [1 2 1] in the vertical and horizontal directions. It is remarked that the filter coefficients indicated by [1 2 1] signify processing where the value obtained by multiplying the signal value of the pixel of interest by two and the values obtained by multiplying the signal values of the pixels adjacent to the pixel of interest in the designated direction by one are added together, and the resulting value is normalized. It should be noted that filter coefficients for synchronizing are not limited to the above, and other filter coefficients may be used. Also, in the neighboring pixels to which the low-pass filter is applied may be included not only pixels of the same color that are located in horizontal or vertical direction from the pixel of interest, but also pixels of the same color that are located in oblique directions.

Next, separately for each color R, G1, G2, and B from the image signal, the first reduction circuit 301 reduces the image horizontally as well as vertically to ½ its size. Assuming the original image size (pixel count) to be N×M (where N, M are arbitrary integers), the size after reduction becomes (N/2)× (M/2). As a method for reducing the size, e.g. the area-average method or the like may be followed. The second noise suppression circuit 303 performs noise suppression processing with respect to the color signals of each color reduced by the first reduction circuit 301. Noise suppression processing here is the same as noise suppression processing by the first noise suppression circuit 302. With respect to the noise suppression processed images, the enlargement circuit 304 enlarges the image size through interpolation processing etc. by a factor of two in each of the horizontal and vertical directions.

Figure 5:
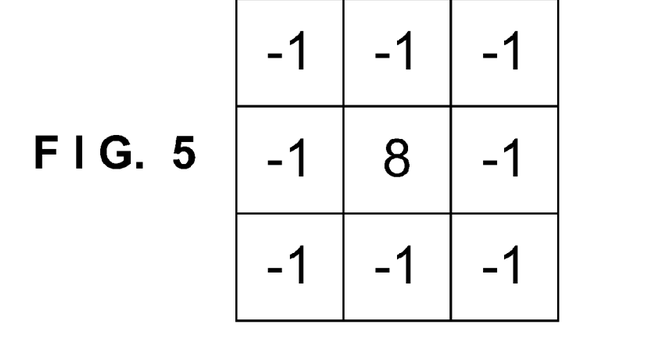
FIG. 5 is an example of an edge detection filter in a mixing circuit 305.

With respect to the color signals processed and output by the first noise suppression circuit 302 and the second noise suppression circuit 303, the mixing circuit 305 performs mixing processing. First, mixing processing extracts an edge component from the color signal output from the first noise suppression circuit 302. Edge extraction is done e.g. by applying a filter as in FIG. 5 to a 3×3 pixel area containing the pixel of interest. In this way, edge information in which each element represents the edge component at a pixel of interest is generated having a size N×M that is equal to the image size after band division. Each element of the edge information corresponds to a pixel position in the color-separated image signal (size N×M), which are output from the first noise suppression circuit 302 and the enlargement circuit 304.

Figure 6:
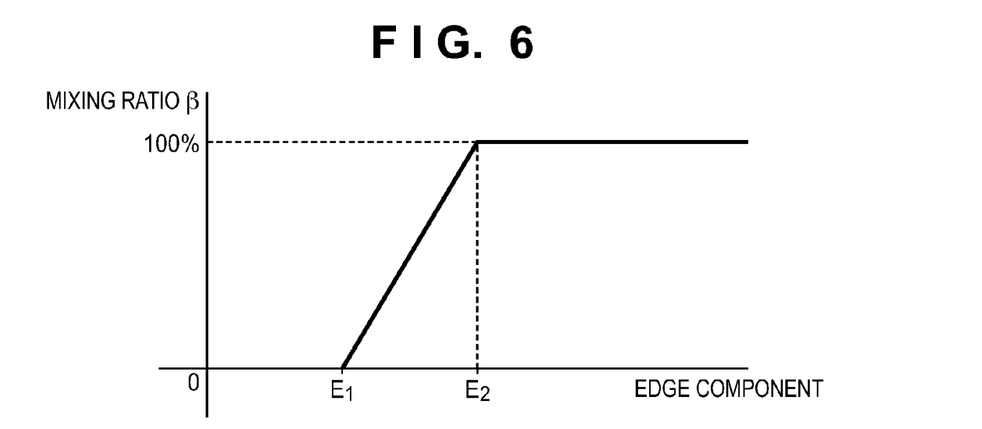
FIG. 6 is a diagram showing a mixing ratio of a high-frequency layer image signal against an edge component.

Now, based on the magnitude of the edge component corresponding to each pixel position, a ratio for mixing the pixels of the color signal from the first noise suppression circuit 302 and the pixels of the color signal from the enlargement circuit 304 is calculated according to the relationship shown in FIG. 6. That is, the mixing ratio for the color signal of the first noise suppression circuit 302 is set to 100% for pixel positions where the edge strength is high, while conversely the mixing ratio is set to 0% where the edge strength is low. Mixing the signals using this mixing ratio enables the mixing circuit 305 to obtain a synchronized signal that maintains a sense of resolution in edge portions while being sufficiently noise-suppressed in non-edge portions. In an interval between edge component values E1 and E2, as in FIG. 6, the mixing ratio β may be varied e.g. as a linear function. Moreover, the magnitude of E1 and E2 may be preset in accordance with values of camera parameters (e.g. sensitivity), and varies depending on the value of camera parameters being set.

Thus, by mixing color signals obtained by undergoing two kinds of noise suppression processing, a plurality of color signals R, G1, G2, and B can be generated.

While here description has been given by way of an example in which noise suppression processing is performed with respect to each of two images of different sizes, a configuration may also be chosen in which the number of differently-sized images is set to three or more, and after performing noise suppression processing with respect to each of these three or more images, they are mixed.

In step S402, the one-plane conversion circuit 202 generates a one-plane image, being an image with one signal for each pixel, from the noise-suppression processed plurality of color signals. The one-plane conversion processing in the present embodiment generates a color signal corresponding to the color pattern of the original Bayer array by sampling from each of the above-described synchronized color signals of the colors. That is, the one-plane conversion circuit 202 converts the images output from the mixing circuit 305, which for each pixel have a color signal for each color, into an image that for each pixel has one of the color signals, being configured with the Bayer array shown in FIG. 11. Performing one-plane conversion in this way not only enables to reduce the amount of memory used but can be preferable also in terms of image quality. That is to say, the color signals obtained from the band-division noise suppression circuit 201 have deteriorated in their high-frequency characteristics due to interpolation having been performed during synchronization. By returning them to the state of the original color array through trimming the color signal obtained in the interpolation, a signal in which only noise has been removed from the original image signal is obtained, such that by performing adaptive interpolation, to be described later, and the like with respect to this signal, it becomes possible to obtain an image with less deterioration of the high-frequency characteristics.

Figure 7:
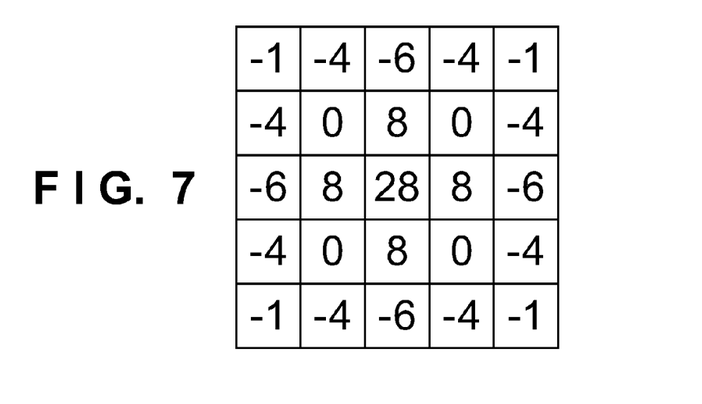
FIG. 7 is an example of a high-frequency extraction filter in a high-frequency extraction circuit 203.

In step S403, said one-plane converted image is stored in the memory 204. In following step S404, the high-frequency extraction circuit 203 extracts a high-frequency component representing noise from the input image signal. Hereinafter, the high-frequency component representing noise will be also referred to simply as noise component. As the extracting filter, e.g. a 5×5 high-pass filter as shown in FIG. 7 is used. Incidentally, while the input image signal may be separated into colors to perform noise extraction for each color, in order to save memory in the present embodiment noise extraction is performed only from a certain color component, namely the G component (one of G1 or G2).

Figure 10A:
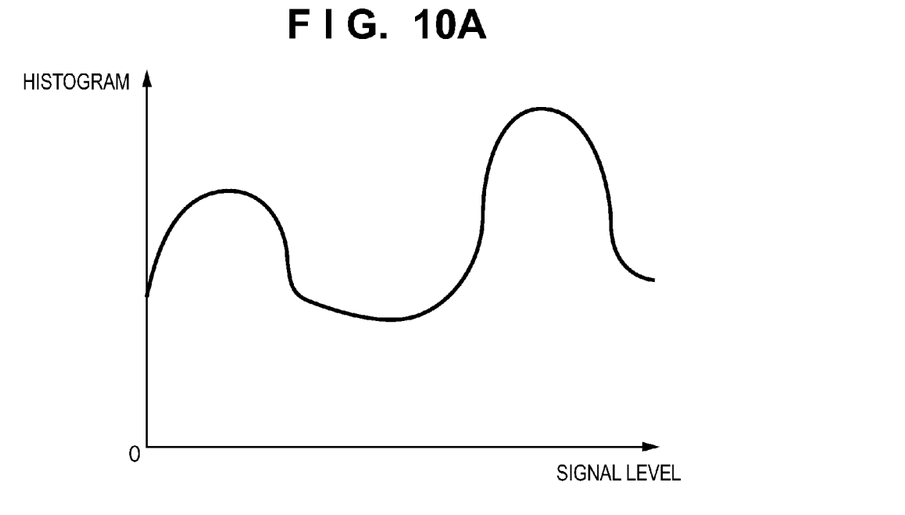
FIG. 10A and FIG. 10B are diagrams for explaining frequency distributions of the signal levels of an input signal and a high-frequency extraction signal.
Figure 10B:
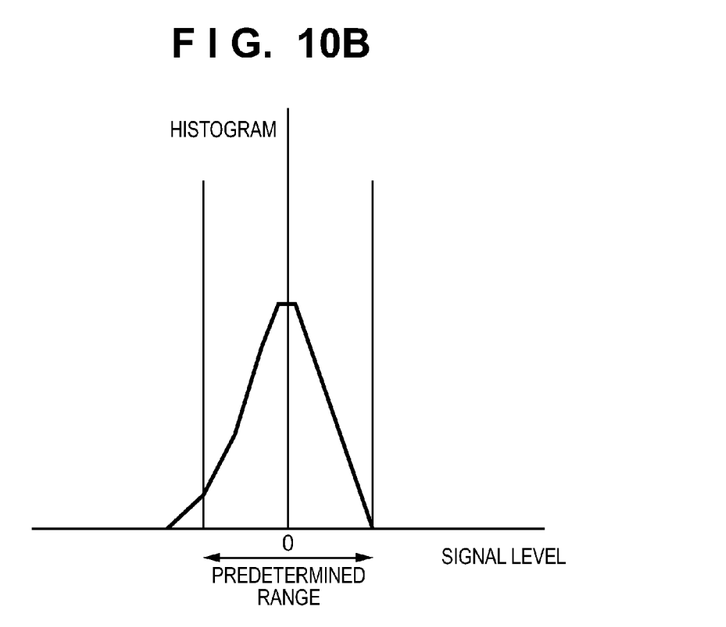

However, memory saving methods are not limited to the above method of reducing the number of colors, for example, the noise component extracted from the G signal may additionally be subjected to compression processing. Compression processing is carried out e.g. as follows. FIG. 10A shows an example of a frequency distribution of the signal level of the input signal before the high-frequency component extraction. In contrast, FIG. 10B shows an example of a frequency distribution of the signal level of the result of extracting the noise component using a high-pass filter. For image signals in general, since there are few steep changes in the signal, the frequency distribution of the extraction result for the noise component tends to collect near the center. Thus, by clipping the signal output to fit within a predetermined range near the center of the extraction result for the noise component, further compression of the signal amount is enabled.

In step S405, the extracted signal is stored in the memory 204. In step S406, the adaptive interpolation circuit 206 reads the one-plane converted image from the memory 204 to perform adaptive interpolation processing. The adaptive interpolation processing detects the correlation of the signal in the vertical and horizontal directions at each pixel of the one-plane converted image, to calculate interpolated pixel values by preferentially using the pixel values of neighboring pixels of the same color located in the direction of higher correlation. Further information about adaptive interpolation processing will be omitted because it is a known technique. By performing adaptive interpolation, once again an image having a color signal of each color for each pixel is generated.

Here will be explained why the adaptive interpolation processing by the adaptive interpolation circuit 206 is performed after performing the processing by the band-division noise suppression circuit 201 and the one-plane conversion circuit 202.

When the adaptive interpolation circuit 206 performs adaptive interpolation with respect to an input signal not having passed through the band-division noise suppression circuit 201 and the one-plane conversion circuit 202, it becomes necessary to detect the direction of higher correlation per pixel of interest from an image containing a large amount of noise component. For example, in order to detect the correlation in which of the vertical and horizontal directions is higher, the signal level difference between adjacent pixels of the same color above and below the pixel of interest may be compared to the signal level differences between adjacent pixels of the same color to the left and right of the pixel of interest. If at this time the signal levels of the individual pixels contain a large amount of noise component, the signal level differences are changed due to the noise component such that it becomes impossible to correctly detect the direction of higher correlation. As a result, due to misjudging the interpolating direction, the possibility rises that pixels of unnatural signal levels come to be included in the image after the adaptive interpolation. On the other hand, since in the present embodiment adaptive interpolation processing is performed with respect to a Bayer array image after having suppressed the noise component, the precision of the adaptive interpolation processing is improved, thus enabling to keep low the possibility that pixels of unnatural signal levels be included in the image after the adaptive interpolation.

In step S407, the edge enhancement circuit 205 reads the one-plane converted image from the memory 204, and performs edge enhancement processing to generate an edge-enhanced signal, i.e. a signal with enhanced edges. The edge enhancement processing generates an image where the edge component has been enhanced as compared to the one-plane converted image, for example by applying the filter shown in FIG. 5, and mixes said image where the edge component has been enhanced with the underlying one-plane converted image. At this time, pixels where the edge component is less than a threshold value may be determined not to be edge portions, such that the image where the edge component has been enhanced is not mixed. It should be noted that edge enhancement processing as well is not limited to this method, but that it is possible to apply other known techniques.

In step S408, the signal extracted as the noise component, which is read from the memory 204, the edge-enhanced signal, and the adaptive-interpolation processed signal are added by the adder 207. Although it can be said that the noise component has been suppressed in the band-division noise suppression circuit 201, a noise component persists in the image being configured with the Bayer array that has been stored in the memory 204. Because the image of which size is given precedence differs depending on the edge component corresponding to each pixel position, also the proportion to which the noise component persists differs depending on the pixel position. That is, the image stored in the memory 204 has both pixels in which a large amount of noise component persists and pixels in which the majority of the noise component has been suppressed. Therefore, when adaptive interpolation processing is performed in the adaptive interpolation circuit 206 with respect to this image with the persisting noise component, the frequency characteristics of the persisting noise component deteriorate because the interpolation processing is performed also for the noise component. Moreover, by performing edge enhancement processing in the edge enhancement circuit 205 with respect to the image with the persisting noise component, the frequency characteristics of the noise component are similarly changed.

Therefore, in the present embodiment, with respect to the image on which adaptive interpolation processing has been performed in the adaptive interpolation circuit 206, the signal extracted as noise component is extracted from the input image signal before the frequency characteristics of the noise component change, to mix the extracted signal with the image on which adaptive interpolation processing has been performed. By doing so, the frequency characteristics of the noise component in the image after adaptive interpolation processing has been performed are enabled to be maintained.

As described above, in the present embodiment a plurality of color signals of different frequency bands for each color is generated from an input image signal, and after performing noise suppression processing is converted into an image signal of one plane. Also, a noise component is separately extracted from the image signal and kept, in order to add the noise component to an image obtained after subjecting the one-plane converted image to adaptive interpolation processing and edge enhancement processing. In this embodiment, the edge enhancement processing is not required and may be omitted. Adopting in this way a configuration in which to a signal obtained by correcting a noise-suppressed signal for sense of resolution a noise component is added enables to prevent it from becoming unnatural visually due to noise suppression processing, while maintaining a visually favorable state also of the frequency characteristics of residual noise.

Second Embodiment

Next, a second embodiment of the present invention will be described. In this embodiment, a case will be described that involves outputting an image that has been reduced with respect to the input image. The basic configuration is the same as in the first embodiment, it will be described focusing on differences.

Figure 8:
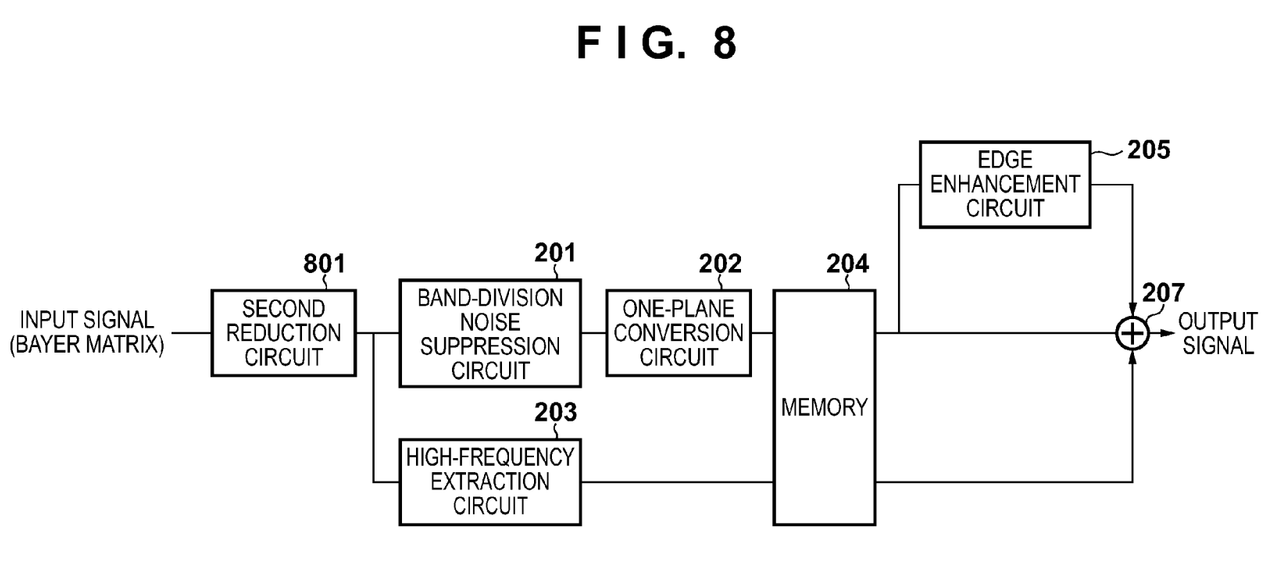
FIG. 8 is a diagram showing a part of the configuration of an image processing circuit 105 according to a second embodiment of the present invention.

FIG. 8 is a diagram showing a part of the configuration of an image processing circuit 105 according to the present embodiment. Within FIG. 8, the same reference numerals as in FIG. 2 have been applied to circuits having the same configuration as in FIG. 2. What differs from FIG. 2 is that there is no adaptive interpolation circuit 206, while a second reduction circuit 801 has been added.

Figure 9:
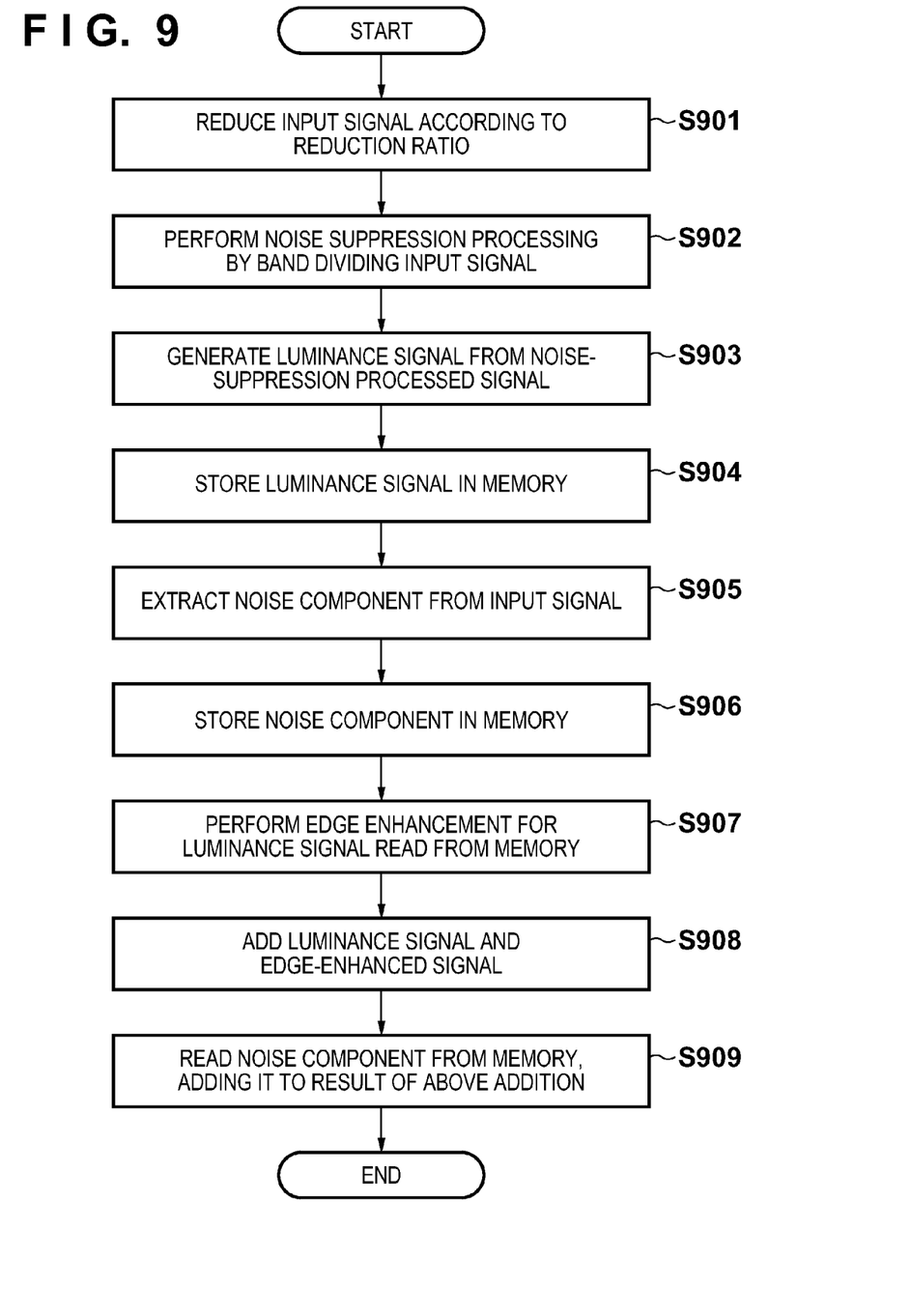
FIG. 9 is a flowchart for explaining the processing content in the image processing circuit 105 of FIG. 8.

FIG. 9 is a flowchart for explaining the processing contents of the image processing circuit 105 according to the present embodiment.

In step S901, the second reduction circuit 801 reduces the input signal in accordance with a predetermined reduction ratio. It separates the input signal according to each color to respectively apply to each a low-pass filter and perform decimation processing in accordance with the reduction ratio. For example, if the reduction ratio is set to ½ in each of the vertical and horizontal directions, filter processing is performed with respective coefficients [1 2 1] in the horizontal and vertical directions as the low-pass filter, subsequently decimating the pixels at a rate of one out of two pixels.

In step S902, the band-division noise suppression circuit 201 performs noise suppression processing by band division in the same way as in the first embodiment, based on the configuration shown in FIG. 3. However, because the input signal is already synchronized, synchronization processing of the band-division noise suppression circuit 201 is omitted.

In step S903, one-plane conversion circuit 202 generates a luminance signal from the above-described noise-suppressed color signals, according to the following formula.

$$Y = 0.3 \times R + 0.59 \times G + 0.11 \times B \tag{A}$$

In this way, through adding together a plurality of color signals multiplied by coefficients, the one-plane conversion circuit 202 of the present embodiment generates a one-plane converted image having one luminance signal per pixel. Note that in the present embodiment, only the luminance signal is subjected to the subsequent edge enhancement processing. In the present embodiment, the generation of the luminance signal from the color signals for which noise has been suppressed in the band-division noise suppression circuit 201 enables to reduce the possibility that the luminance signal is generated from a state in which the balance of the levels of the signals R, G, and B is lost due to the noise component. However, as in the first embodiment, because the level of suppression of noise components differs according to the edge component, also in the luminance signal the persisting noise component differs according to pixel position.

In step S904, the luminance signal is stored in the memory 204. In step S905, the high-frequency extraction circuit 203 in the same way as in the first embodiment extracts the noise component from the input signal before it is subjected to noise suppression processing in the band-division noise suppression circuit 201. However, while in the first embodiment the high-frequency extraction circuit performs extraction from the G signal only, in the present embodiment noise components are extracted from all color signals R, G, and B, in order to calculate a luminance signal component according to formula (A).

In step S906, the noise component stored in the memory 204. In step S907, the luminance signal is read from the memory to perform edge enhancement processing in the edge enhancement circuit 205.

In step S908, the luminance signal and the edge-enhanced signal are added together. Note that whereas in the first embodiment interpolation processing from the signal read out from the memory was necessary, in the present embodiment, because the luminance signal generated accompanied with the reduction processing in step S901 is read out from the memory, a luminance signal of sufficiently wide band width can be obtained, such that there is no need to perform adaptive interpolation or the like again. However, because due to the edge enhancement processing a change has occurred in the frequency characteristics of the noise component contained in the luminance signal, in step S909 the noise component is read from the memory 204 and added to the above-described added signal. In this way according to the present embodiment, it is possible also for noise suppression processing accompanied with reduction processing to obtain a result that is noise suppressed in a visually favorable manner.

Then, in a circuit not depicted, color difference signals are generated by using the color signals R and B as well as the luminance signal to which the edge-enhanced processing and the noise component have been added, in order to output the luminance signal after the addition of the noise component combined with the unprocessed color difference signals as an image signal from the image processing circuit 105.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-107980, filed on May 9, 2012 which is hereby incorporated by reference herein in its entirety.

What is claimed is:

1. An image processing apparatus comprising:
   a noise suppression unit configured to perform noise suppression processing to a plurality of color signals obtained by band dividing an image signal by color;
   a one-plane conversion unit configured to generate a one-plane image having one signal per pixel, from the plurality of color signals to which the noise suppression processing has been done by said noise suppression unit;
   a processing unit configured to perform image processing in which a frequency characteristic changes, with respect to the one-plane image;
   a noise extraction unit configured to extract a noise component from the image signal; and
   an adding unit configured to add the noise component extracted by said noise extraction unit to a signal obtained by said processing unit,
   wherein said noise suppression unit comprising:
   a first noise suppression unit configured to perform the noise suppression processing to the color signal of each color in the plurality of color signals;
   a first reduction unit configured to reduce a size of the plurality of color signals;
   a second noise suppression unit configured to perform the noise suppression processing to the plurality of color signals of which the size has been reduced;
   an enlargement unit configured to enlarge the size of the plurality of color signals to which the noise suppression processing by said second noise suppression unit has been done, to the size before being reduced; and
   a mixing unit configured to mix, separately for each color, the plurality of color signals output from said first noise suppression unit and the plurality of color signals output from said enlargement unit.

2. The image processing apparatus according to claim 1, wherein said one-plane conversion unit generates the one-plane image by sampling color signals from the plurality of color signals to which the noise suppression processing has been done by said noise suppression unit, in such a way as to form a color array identical to a color array of the image signal, or generates a one-plane image of luminance signals by adding together, multiplied by coefficients, the plurality of color signals to which the noise suppression processing has been done by said noise suppression unit.

3. The image processing apparatus according to claim 1, wherein said processing unit is at least one of an interpolation unit configured to perform interpolation processing to the one-plane image and a filter unit configured to perform filter processing to the one-plane image.

4. The image processing apparatus according to claim 3, wherein said interpolation unit is configured to interpolate the one-plane image separately for each color, thereby letting each pixel have a plurality of color signals.

5. The image processing apparatus according to claim 3, wherein said filter unit is configured to perform edge enhancement to the one-plane image.

6. The image processing apparatus according to claim 1, wherein by the noise suppression processing, a pixel of interest in the color signals is replaced with an average value of the pixel of interest and neighboring pixels, among the neighboring pixels of the pixel of interest, whose difference in pixel value from the pixel of interest is within a predetermined value.

7. The image processing apparatus according to claim 1, wherein said mixing unit performs mixing by performing edge extraction to the plurality of color signals output from said first noise suppression unit, and determining a mixing ratio such that the plurality of color signals output from said first noise suppression unit are used for pixels of higher edge strength.

8. The image processing apparatus according to claim 1, further comprising a second reduction unit configured to reduce a size of the plurality of color signals obtained by band dividing the image signal by color, wherein
said noise suppression unit performs the noise suppression processing using the plurality of color signals output from said second reduction unit with the size having been reduced, and
said noise extraction unit extracts the noise using the plurality of color signals output from said second reduction unit with the size having been reduced.

9. A method for controlling an image processing apparatus, comprising:
a noise suppressing step in which a noise suppression unit performs noise suppression processing to a plurality of color signals obtained by band dividing an image signal by color;
a one-plane converting step in which a one-plane conversion unit generates a one-plane image having one signal per pixel, from the plurality of color signals to which the noise suppression processing has been done in said noise suppression step;
a processing step in which a processing unit performs image processing in which a frequency characteristic changes, with respect to the one-plane image;
a noise extracting step in which a noise extraction unit extracts a noise component from the image signal; and
an adding step in which an adding unit adds the noise component extracted in said noise extraction step to an image obtained in said processing step,
wherein said noise suppression step comprising:
a first noise suppression step of performing the noise suppression processing to the color signal of each color in the plurality of color signals;
a first reduction step of reducing a size of the plurality of color signals;
a second noise suppression step of performing the noise suppression processing to the plurality of color signals of which the size has been reduced;
an enlargement step of enlarging the size of the plurality of color signals to which the noise suppression processing in said second noise suppression step has been done, to the size before being reduced; and
a mixing step of mixing, separately for each color, the plurality of color signals generated in said first noise suppression step and the plurality of color signals generated in said enlargement step.

10. A non-transitory computer-readable storage medium storing a computer program for causing an image processing apparatus to perform a control method therefor, said method comprising:
a noise suppressing step in which a noise suppression unit performs noise suppression processing to a plurality of color signals obtained by band dividing an image signal by color;
a one-plane converting step in which a one-plane conversion unit generates a one-plane image having one signal per pixel, from the plurality of color signals to which the noise suppression processing has been done by said noise suppression unit;
a processing step in which a processing unit performs image processing in which a frequency characteristic changes, with respect to the one-plane image;
a noise extracting step in which a noise extraction unit extracts a noise component from the image signal; and
an adding step in which an adding unit adds the noise component extracted in said noise extraction step to an image obtained in said processing step,
wherein said noise suppression step comprising:
a first noise suppression step of performing the noise suppression processing to the color signal of each color in the plurality of color signals;
a first reduction step of reducing a size of the plurality of color signals;
a second noise suppression step of performing the noise suppression processing to the plurality of color signals of which the size has been reduced;
an enlargement step of enlarging the size of the plurality of color signals to which the noise suppression processing in said second noise suppression step has been done, to the size before being reduced; and
a mixing step of mixing, separately for each color, the plurality of color signals generated in said first noise suppression step and the plurality of color signals generated in said enlargement step.

* * * * *